US011518552B2

(12) United States Patent
Ulrich et al.

(10) Patent No.: US 11,518,552 B2
(45) Date of Patent: Dec. 6, 2022

(54) OMNI-DIRECTIONAL EXTENSIBLE GRASP MECHANISMS

(71) Applicant: The Aerospace Corporation, El Segundo, CA (US)

(72) Inventors: Evan Robert Ulrich, Manhattan Beach, CA (US); Samuel Takezo Shimohara, Gardena, CA (US)

(73) Assignee: THE AEROSPACE CORPORATION, El Segundo, CA (US)

( * ) Notice: Subject to any disclaimer, the term of this patent is extended or adjusted under 35 U.S.C. 154(b) by 457 days.

(21) Appl. No.: 16/731,255

(22) Filed: Dec. 31, 2019

(65) Prior Publication Data
US 2021/0197990 A1    Jul. 1, 2021

(51) Int. Cl.
*B64G 4/00*     (2006.01)
*B25J 15/00*    (2006.01)
*B64G 1/64*     (2006.01)

(52) U.S. Cl.
CPC ............ *B64G 4/00* (2013.01); *B25J 15/0028* (2013.01); *B64G 1/646* (2013.01); *B64G 2004/005* (2013.01)

(58) Field of Classification Search
CPC .... B64G 1/646; B64G 4/00; B64G 2004/005; B25J 15/0028; B25J 15/0033; B25J 15/0052
USPC ...................................................... 244/172.4
See application file for complete search history.

(56) References Cited

U.S. PATENT DOCUMENTS

| | | | | |
|---|---|---|---|---|
| 3,193,213 A * | 7/1965 | Eberwine | ............... | B64G 1/646 213/88 |
| 4,195,804 A * | 4/1980 | Hujsak | .................. | B64G 1/646 244/172.4 |
| 4,219,171 A * | 8/1980 | Rudmann | .............. | B64G 1/646 244/172.4 |
| 4,664,344 A * | 5/1987 | Harwell | ................. | B64G 1/646 244/172.4 |
| 4,858,979 A * | 8/1989 | Parma | .................. | B25J 15/0266 901/38 |
| 6,275,751 B1 * | 8/2001 | Stallard | .................. | B64G 1/646 701/1 |
| 6,840,481 B1 * | 1/2005 | Gurevich | ............... | B64G 1/646 244/172.4 |
| 7,207,525 B2 * | 4/2007 | Bischof | .................... | B25J 15/10 244/172.6 |
| 9,399,295 B2 * | 7/2016 | Roberts | ................. | B64G 1/1078 |
| 9,840,342 B2 * | 12/2017 | Chambert | ................ | B64G 4/00 |
| 2002/0063188 A1 * | 5/2002 | Steinsiek | ............. | B64G 1/1078 244/172.4 |

(Continued)

*Primary Examiner* — Brady W Frazier
(74) *Attorney, Agent, or Firm* — LeonardPatel PC

(57) ABSTRACT

Omni-directional, extensible grasp mechanisms are disclosed. Such grasp mechanisms may be used as a robotic end effector for docking, grasping, and manipulating space structures, or to interconnect other structures or vehicles. Novel interconnected lattice structures may enable large arrays to be assembled. The grasp mechanisms may be used to create structures from parallel docking linkages. This may enable reconfiguration of multiple docked space vehicles and/or structures without the use of propellant. The grasp mechanisms have the ability to make and break connections multiple times, enabling a nondestructive and reversible docking process.

30 Claims, 8 Drawing Sheets

(56) References Cited

U.S. PATENT DOCUMENTS

| | | | | |
|---|---|---|---|---|
| 2015/0166202 A1* | 6/2015 | Maediger | ............. | B25J 15/0066 |
| | | | | 244/171.1 |
| 2015/0314893 A1* | 11/2015 | Rembala | ................ | B64G 1/222 |
| | | | | 244/172.4 |
| 2016/0114912 A1* | 4/2016 | Vezain | ................... | B64G 1/646 |
| | | | | 244/172.6 |
| 2018/0148197 A1* | 5/2018 | Halsband | ............... | B64G 1/242 |
| 2019/0322394 A1* | 10/2019 | Rivas Sánchez | ...... | B64G 1/641 |

* cited by examiner

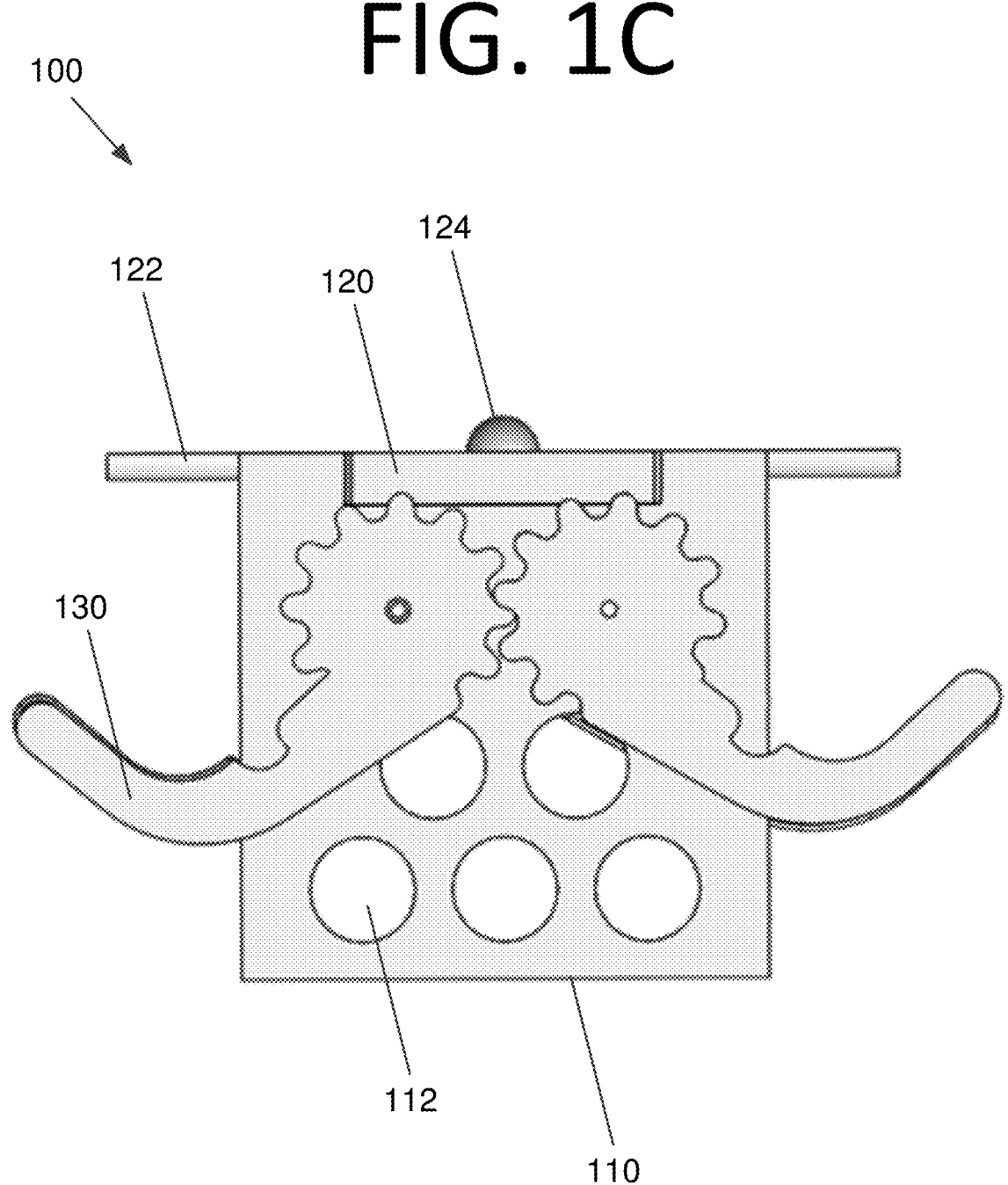

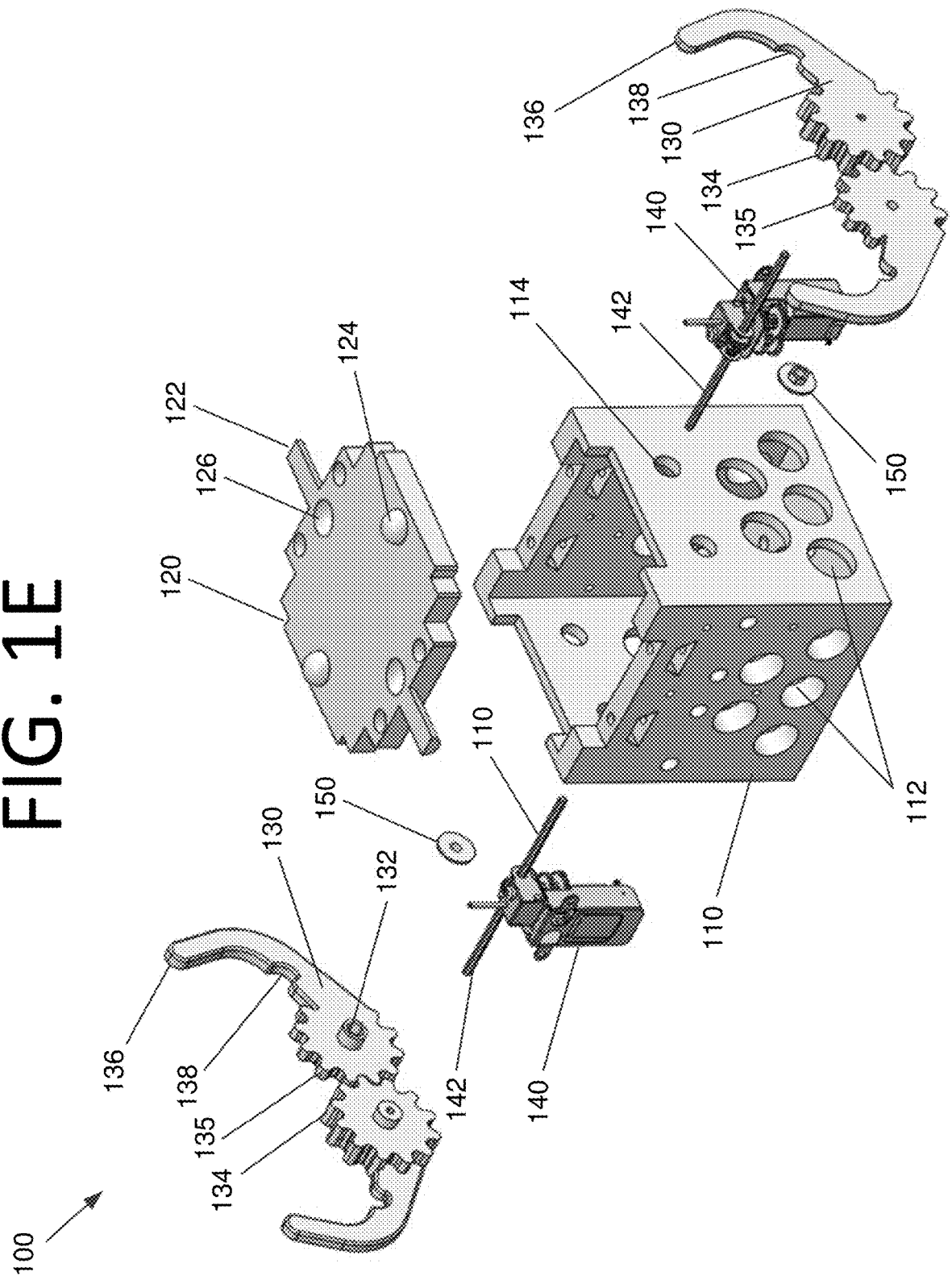

OMNI-DIRECTIONAL EXTENSIBLE GRASP MECHANISMS

FIELD

The present invention generally relates to interconnection mechanisms, and more particularly, to omni-directional, extensible grasp mechanisms.

BACKGROUND

Current approaches to docking spacecraft are designed for large scale satellites and/or for use with a human in the loop. Current docking techniques are initiated through contact of mirrored surfaces, relying on the spacecraft or the human to do all of the maneuvering to complete the docking process. Fuel is a scarce resource in orbit and maneuvering for docking consumes this valuable resource when performed by spacecraft. Currently, thrusters of an attitude control system (ACS) are used to position the spacecraft and complete docking. Also, the port used for docking is in a fixed orientation that requires maneuvers to be performed by the spacecraft, typically at the expense of fuel. Additionally, this head-to-head or parallel approach to docking has limitations that prevent complex out-of-plane structures from being formed from a single docking port. Accordingly, an improved docking mechanism may be beneficial.

SUMMARY

Certain embodiments of the present invention may provide solutions to the problems and needs in the art that have not yet been fully identified, appreciated, or solved by conventional interconnection technologies. For example, some embodiments pertain to omni-directional, extensible grasp mechanisms.

In an embodiment, an apparatus includes a chassis and an interface plate integrally formed with or operably connected to the chassis. The interface plate includes a plurality of grasper target rods. The apparatus also includes a plurality of grasper claws configured to connect to or disconnect from respective grasper target rods of another apparatus.

In another embodiment, a grasp mechanism includes at least two grasper target rods and two pairs of grasper claws configured to connect to or disconnect from respective grasper target rods of another grasp mechanism. Each of the plurality of grasper claws includes a gear and a grasping extension. The grasping extension includes a notch configured to engage with a respective grasper target rod of the other grasp mechanism. The grasping extensions of each pair of grasper claws are configured to pass next to one another when interconnecting with the other grasp mechanism.

In yet another embodiment, a grasp mechanism includes a chassis and an interface plate integrally formed with or operably connected to the chassis. The interface plate includes a pair of grasper target rods. The grasp mechanism also includes a plurality of pairs of grasper claws configured to connect to or disconnect from respective grasper target rods of another grasp mechanism.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 1C is a side view illustrating the grasp mechanism, according to an embodiment of the present invention.

FIG. 1E is an exploded perspective view illustrating the grasp mechanism.

Unless otherwise indicated, similar reference characters denote corresponding features consistently throughout the attached drawings.

DETAILED DESCRIPTION OF THE EMBODIMENTS

Figure 1A:
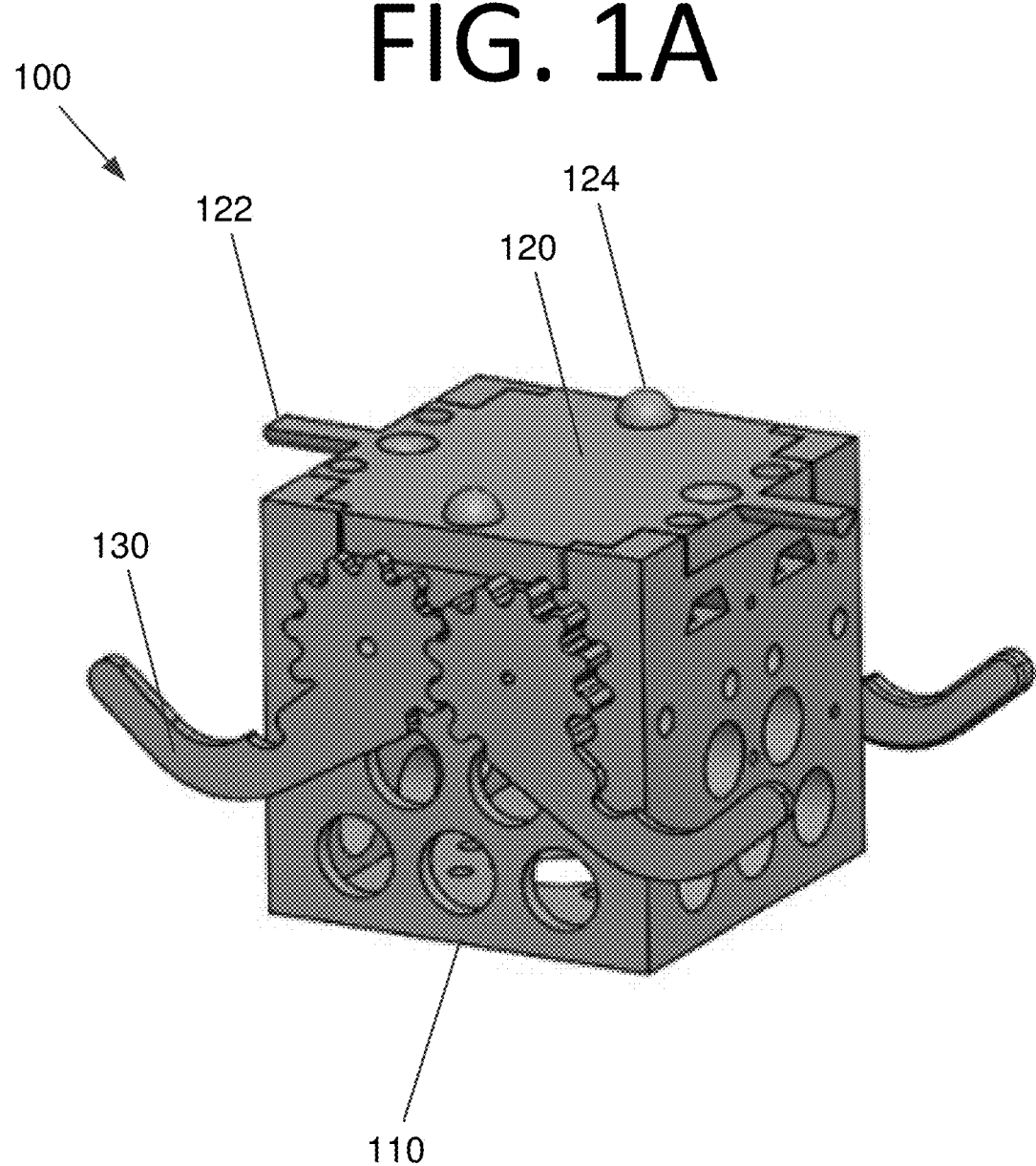
FIG. 1A is a perspective view illustrating a grasp mechanism, according to an embodiment of the present invention.
Figure 1B:
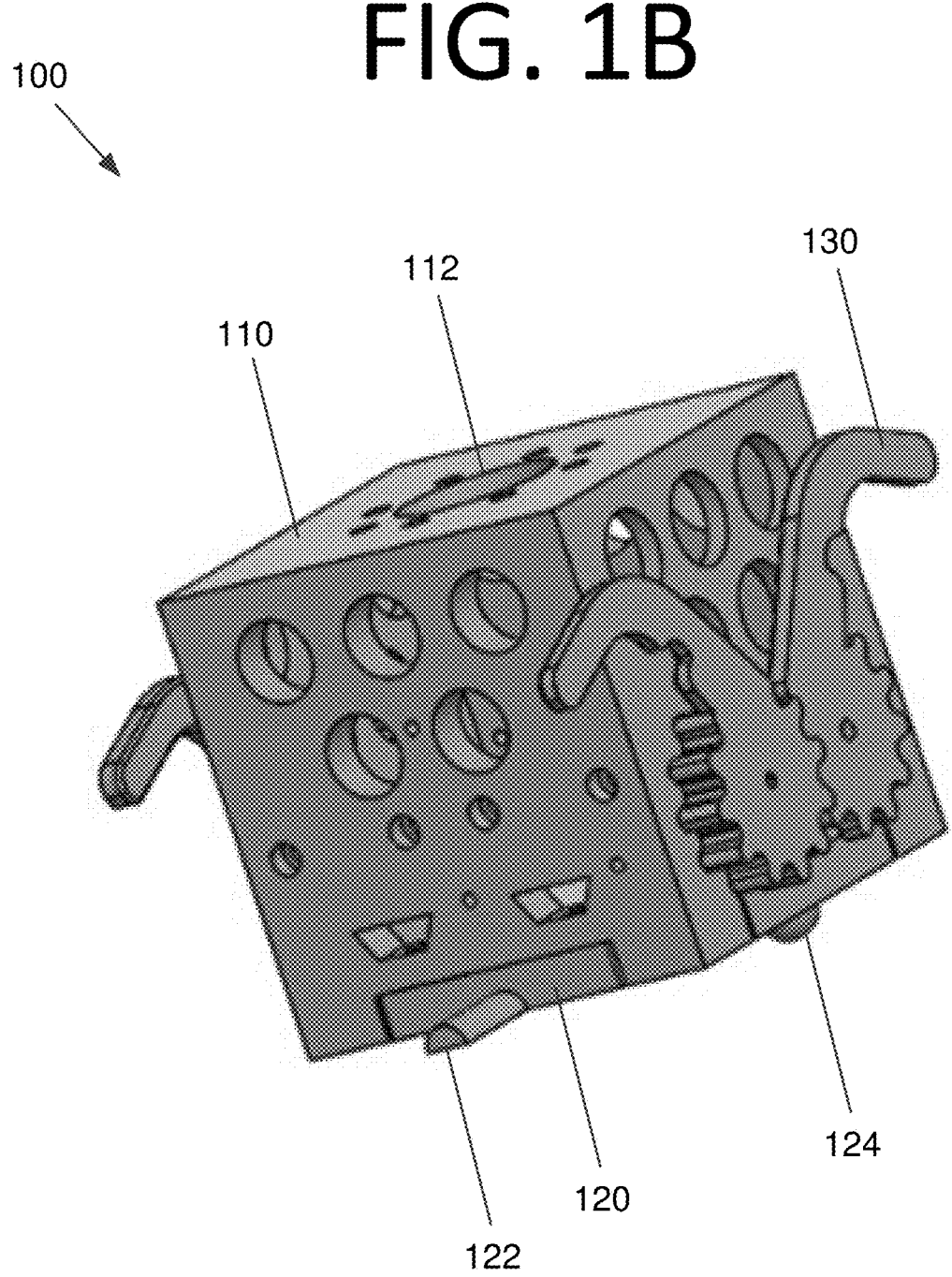
FIG. 1B is another perspective view illustrating the grasp mechanism, according to an embodiment of the present invention.
Figure 1D:
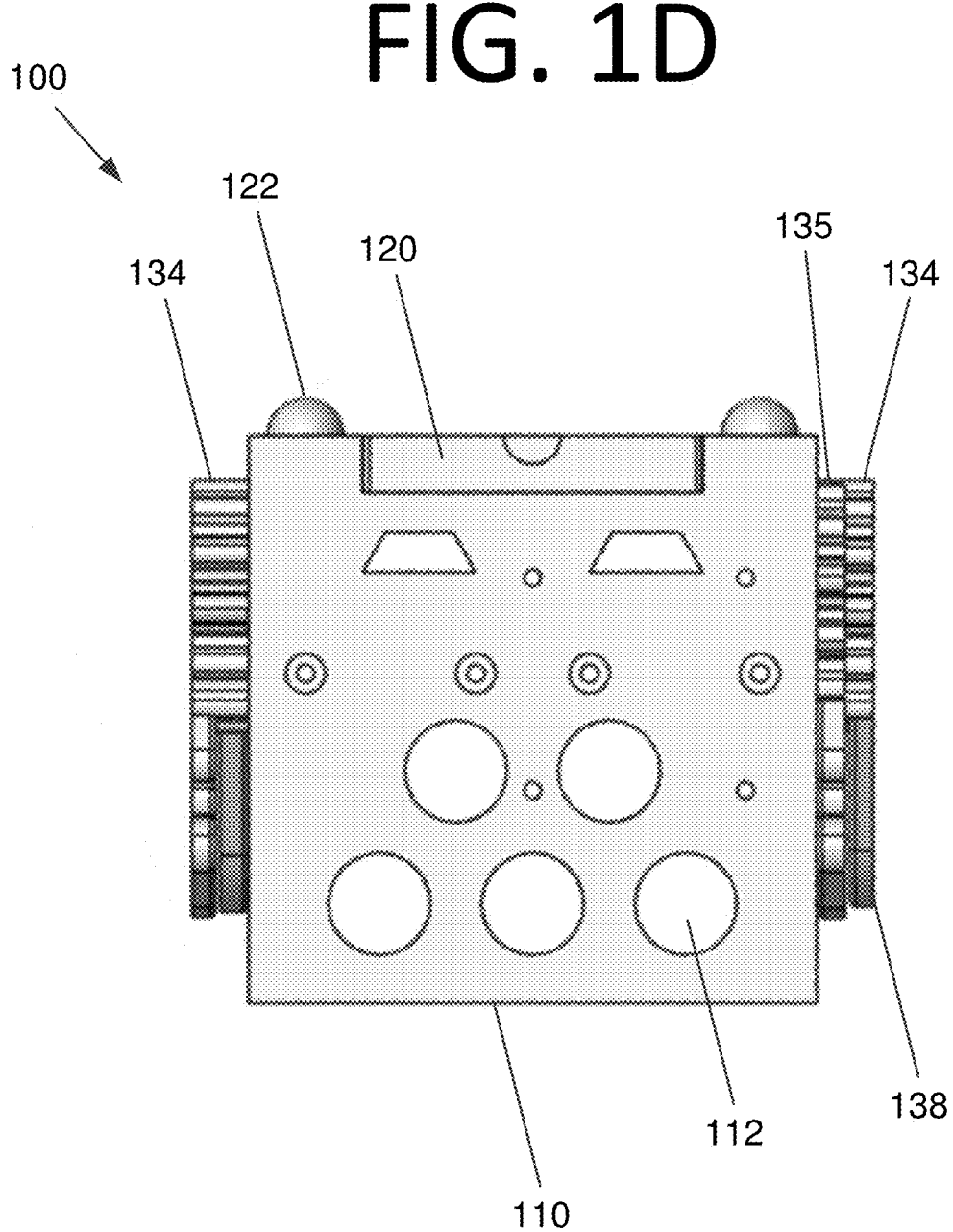
FIG. 1D is another side view illustrating the grasp mechanism, according to an embodiment of the present invention.

Some embodiments of the present invention pertain to omni-directional, extensible grasp mechanisms. For instance, some embodiments pertain to a robotic end effector for docking, grasping, and manipulating space structures. In certain embodiments, the grasp mechanisms may be used to interconnect other structures or vehicles and may be robotic or interconnected manually. Novel interconnected lattice structures enable large arrays to be assembled in some embodiments.

The grasp mechanism of some embodiments can be used to create structures from parallel docking linkages. This may enable reconfiguration of multiple docked space vehicles and/or structures without the use of propellant in certain embodiments. In some embodiments, the grasp mechanisms have the ability to make and break connections multiple times, enabling a nondestructive and reversible docking process.

FIGS. 1A-E illustrate a grasp mechanism 100, according to an embodiment of the present invention. Grasp mechanism 100 includes a box-shaped chassis 110 with holes 112 that reduce weight and may also be convenient for wiring purposes. Holes 112 may have any shape(s) and/or sizes without deviating from the scope of the invention. In certain embodiments, chassis 110 is a solid piece with no holes. However, any shape, size, and/or configuration of chassis 110 (e.g., spherical, box-shaped, irregular three-dimensional shapes, or any other three-dimensional shape) may be used without deviating from the scope of the invention. The box shape of chassis 110 may be beneficial in obtaining a certain form factor for space vehicles (e.g., 1U) in some embodiments.

Four motor shaft holes 114 are also provided so shafts 142 of worm gear assemblies with motors 140 can protrude therethrough and connect to respective grasper claws 130 by extending into shaft inlet 132 and being fastened by claw fastener 150. An interface plate 120 is secured to the top of chassis 110. In some embodiments, interface plate may be integrally formed with chassis 110. Grasper target rods 122 provide mechanisms for graspers from another grasp mechanism to interconnect with grasp mechanism 100. Male alignment guides 124 and female alignment guides 126 assist with aligning grasp mechanisms 100 when interconnecting and assist in securing grasp mechanisms 100 together then connected.

Four grasper claws 130 are provided in this embodiment. However, in some embodiments, different numbers of grasper claws may be used (e.g., only one per side, three or more pairs, etc.). The number and location(s) of grasper claws 130 will depend on the shape of grasp mechanism 100. Grasper claws 130 include either a thicker gear 134 or a thinner gear 135, and each pair of grasper claws 130 has one of each. In some embodiments, thicker gear end 134 is twice the thickness of thinner gear 135 end 135. In certain embodiments, grasping extensions 136 have the same thickness as thinner gear 135. Using thicker gear 134 or a thinner gear 135 in a pair of grasper claws 130 enables grasping extensions 136 to pass next to each other when grasping grasper target rods 122 and securing in place via notches 138. This configuration may allow a pair of grasp mechanisms to achieve stronger and more secure connections with one another.

Figure 2:
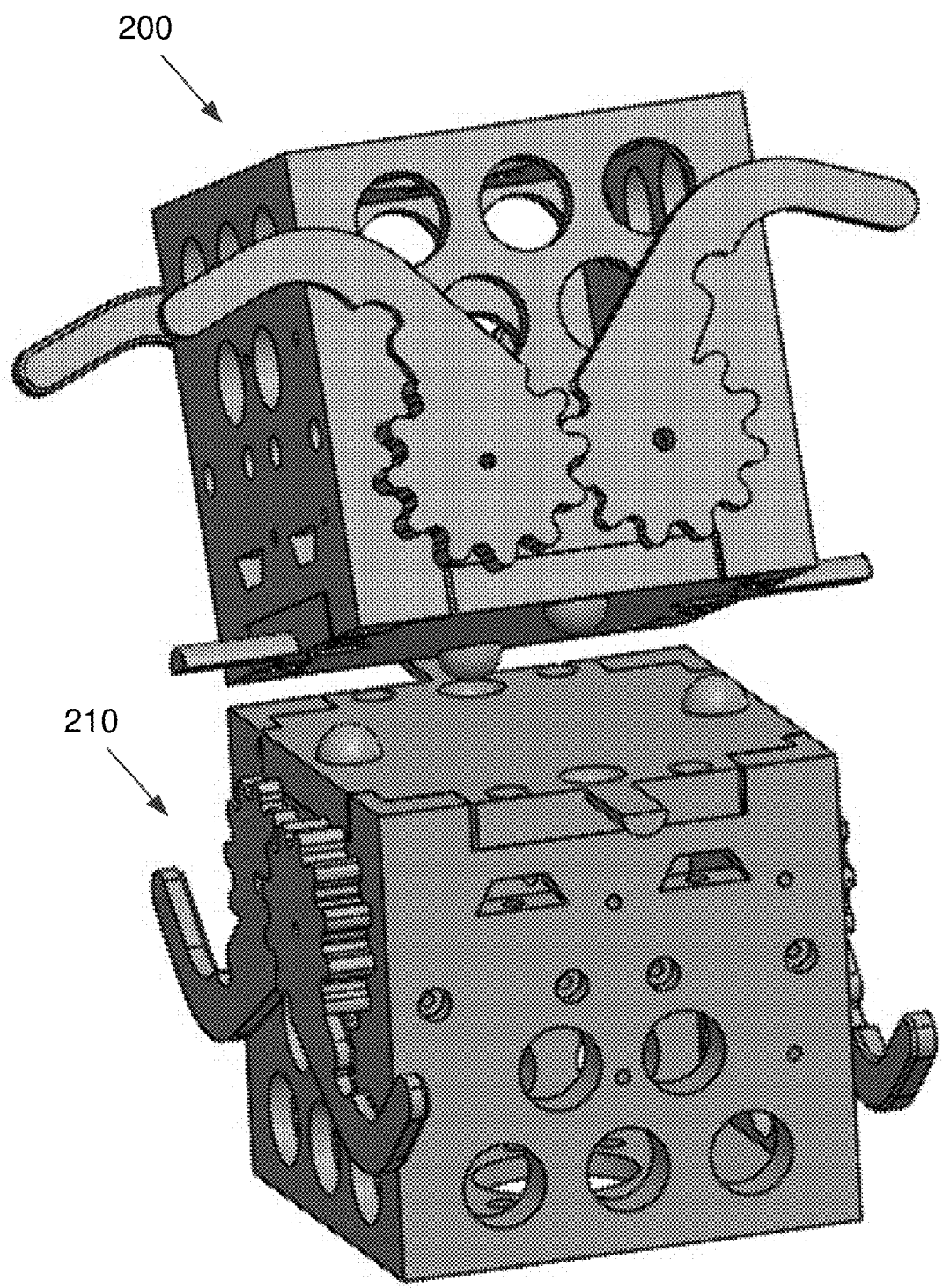
FIG. 2 illustrates two grasp mechanisms just prior to interconnecting, according to an embodiment of the present invention.

FIG. 2 illustrates two grasp mechanisms 200, 210 just prior to interconnecting, according to an embodiment of the present invention. In this embodiment, grasp mechanisms 200, 210 are each identical to grasp mechanism 100 of FIGS. 1A-E, as well as to one another. However, in some embodiments, each grasp mechanism may have a different architecture, so long as they are capable of interlocking.

Figure 3:
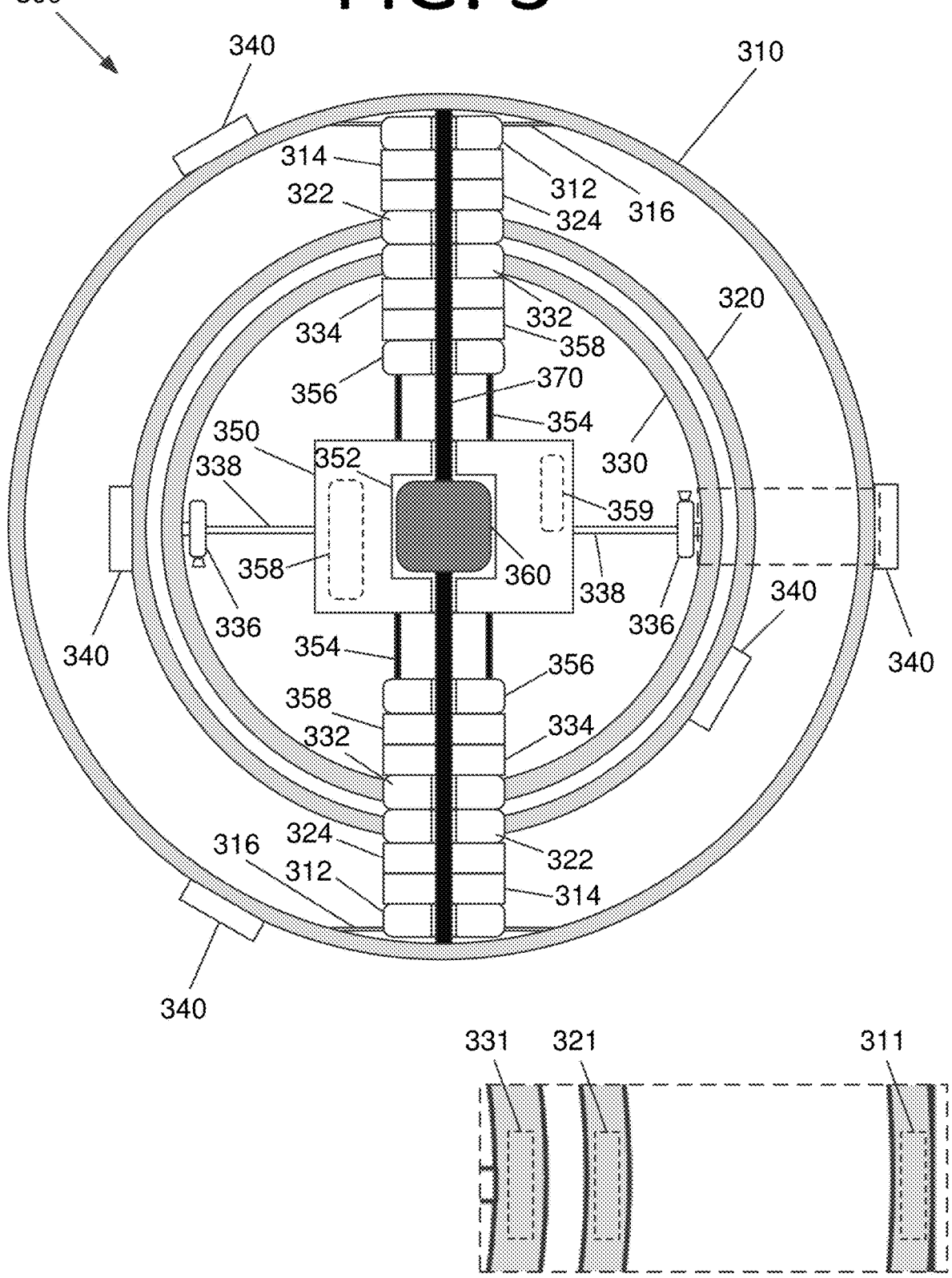
FIG. 3 illustrates a space vehicle with a nested ring structure that is designed to rotate about one axis, according to an embodiment of the present invention.

In some embodiments, grasp mechanisms may be attached to or otherwise a part of movable trams of a space vehicle. FIG. 3 shows a space vehicle 300 with a nested ring structure that is designed to rotate about one axis (shown as the y-axis here via shaft 370). In some embodiments, some nested rings rotate about a y-axis shaft, while others rotate about an x-axis shaft perpendicular to the y-axis via a gimbaled mechanism. In certain embodiments, these shafts may not be orthogonal to one another. Indeed, any number of shafts, interconnection therebetween, gimbaling mechanisms, and orientation may be used without deviating from the scope of the invention.

A payload/control section 350 includes a reaction wheel housing 352 that houses a momentum management system 360. Momentum management system 360 controls the net angular momentum vector, and includes reaction wheels (e.g., three-axis reaction wheels) and a momentum dumping system (e.g., magnetorquers) that enable the desaturation of the momentum of the reaction wheels. Each nested ring 310, 320, 330 and payload/control section 350 has its own respective motors 312, 322, 332, 356 and can independently rotate. The rotation can be continuous, fixed angular motion that is then stopped, or motion to a prescribed set of angular locations with stops at constant or varying times without deviating from the scope of the invention. Any rotation induced by motors 312, 322, 332, 356 should be countermanded by momentum management system 360 to keep the overall attitude (i.e., a defined observation direction) of nested ring space vehicle 300 steady.

Motors 312 are attached to outer ring 310 via support structure 316, but are able to rotate about shaft 370 while attached thereto. Motors 322 are attached to middle ring 320, but are able to rotate about shaft 370 while attached thereto. Motors 332 are attached to inner ring 330, but are able to rotate about shaft 370 while attached thereto. Also, motors 356 are attached to payload/control section 350 via tubes/struts 354, but are able to rotate about shaft 370 while attached thereto. All motors 312, 322, 332, 356 in this embodiment have properties currently found in rotation stages with a center hole aperture: (1) bidirectional motion with velocity control; (2) encoders to ensure precise angular motion and positioning; and (3) mechanical clutches to lock. Motors 312, 322, 332, 356 are also designed to operate in a vacuum environment. In some embodiments, the motor function can be integrated into shaft 370. In certain embodiments, only one motor per ring is used.

Thus, rings 310, 320, 330 and payload/control section 350 rotate about shaft 370. Shaft 370 may also include data and/or power lines that provide data and/or power between rings 310, 320, 330 and payload/control section 350. In some embodiments, shaft 370 may also contain one or more propellant fuel lines to deliver propellant to one or more rings. This may be used, for instance, to control rotation thereof, as well as to control and power each tram 340 and a grasper (not shown in FIG. 3) that "rides" on top of the tram or is otherwise attached thereto. For instance, grasp mechanism 100 of FIGS. 1A-E may ride on top of tram 340 or otherwise be attached thereto.

Payload control section 350 also includes a primary propellant storage tank 358 and a secondary propellant storage tank 359. Secondary propellant storage tank 359 may function as a reserve in some embodiments. Any number, size, and location of propellant storage tanks may be used without deviating from the scope of the invention. Propellant storage tanks 358, 359 are connected to propellant lines 338 (connection not shown) and include electronic valves (not shown) that control the flow of propellant.

Figure 4:
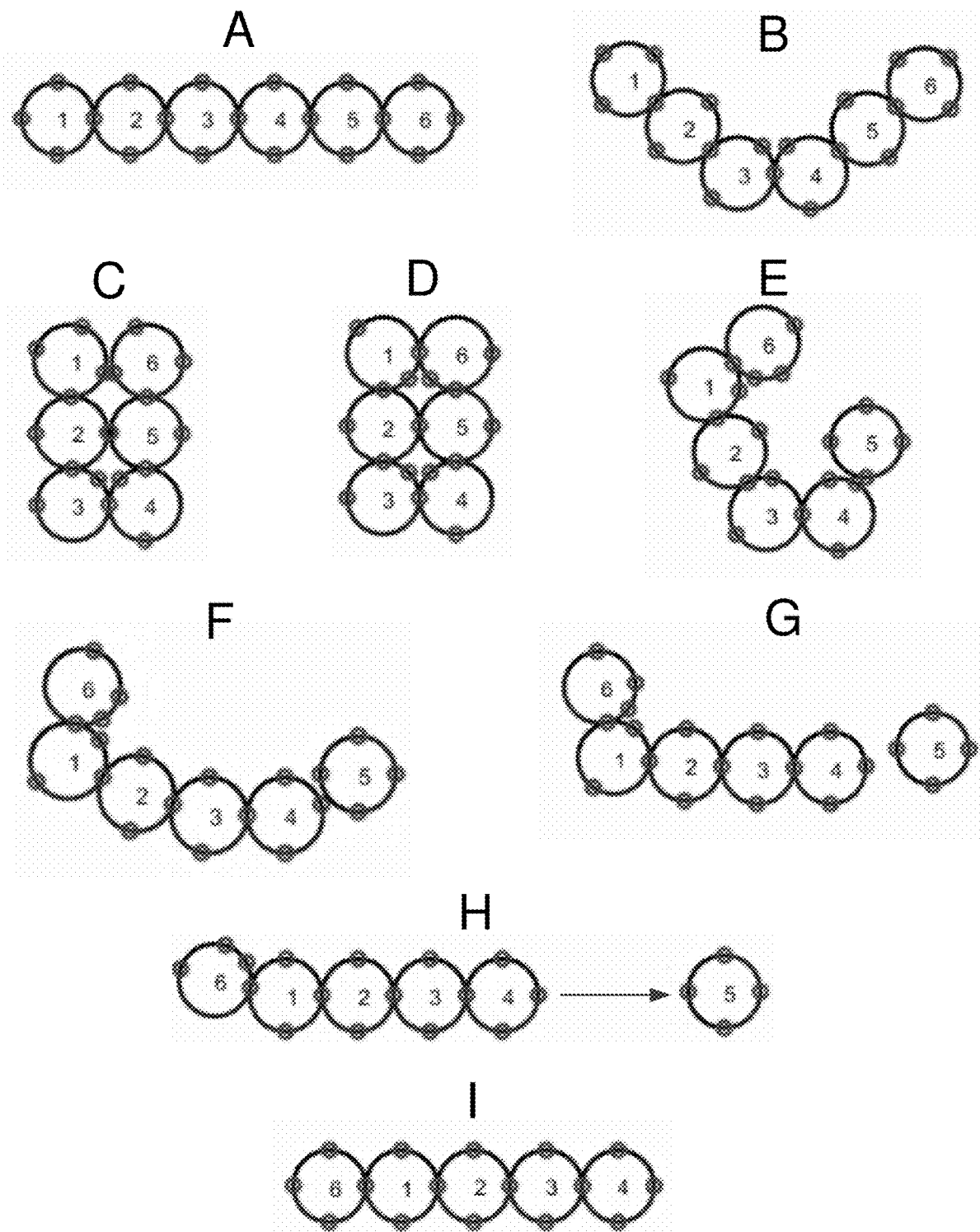
FIG. 4 illustrates multiple space vehicles forming different configurations by moving trams with grasp mechanisms, connecting, and disconnecting, according to an embodiment of the present invention.

FIG. 4 illustrates multiple space vehicles (labeled 1 through 6) forming different configurations (labeled A through I as the space vehicles progressively move with respect to one another) by moving trams with grasp mechanisms, connecting, and disconnecting, according to an embodiment of the present invention. The space vehicles initially begin in a line in configuration A, and then the ends of space vehicles 1 and 6 begin to come together in configuration B via the movement of trams on space vehicles 3 and 4. In configurations C and D, the space vehicles have come together via interlocking grasp mechanisms on the trams and trams on space vehicles 1 and 6 begin to move.

In configuration E, space vehicle 6 is now connected to space vehicle 1, and the space vehicles begin to move again towards a line formation in configuration F. In configuration G, space vehicles 4 and 5 disconnect from one another, and space vehicle 5 moves away from the others in configuration H. By the time space vehicles 1-4 and 6 return to a line formation in configuration I, space vehicle 5 is away from the formation and no longer shown. This maneuver may be performed to release and de-orbit space vehicle 5 due to damage or malfunction, for example.

While space vehicle examples are shown in FIGS. 3 and 4, it should be appreciated that some embodiments of the grasp mechanisms may be used for any desired terrestrial, subterranean, or underwater interconnections. For instance, the grasp mechanisms of some embodiments may be used to form reconfigurable platform structures, trusses, building support structures, underwater structures, or any other desired structure without deviating from the scope of the invention. In certain embodiments, the grasp mechanisms may be part of a land vehicle, an aircraft, a train, a ship, a submarine, etc.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus, comprising:
a chassis;
an interface plate integrally formed with or operably connected to the chassis, the interface plate comprising a plurality of grasper target rods; and
a plurality of grasper claws operably connected to the chassis, the plurality of grasper claws configured to connect to or disconnect from respective grasper target rods of another apparatus, wherein
the plurality of grasper claws are operably connected to one or more portions of the chassis other than the interface plate.

2. The apparatus of claim 1, wherein the chassis comprises a plurality of holes to reduce chassis weight, provide vias for wiring, or both.

3. The apparatus of claim 1, wherein the chassis comprises a box shape.

4. The apparatus of claim 3, wherein the plurality of grasper claws are located on two opposite faces of the chassis, and a remaining four faces of the chassis do not have grasper claws.

5. The apparatus of claim 1, further comprising:
one or more motors, wherein
each of the one or more motors is operably connected to a grasper claw of the plurality of grasper claws by a respective shaft and configured to connect the apparatus to and disconnect the apparatus from the other apparatus by moving the respective grasper claw.

6. The apparatus of claim 1, wherein the interface plate further comprises a plurality of alignment guides configured to assist with aligning the apparatus when the apparatus is interconnected with the other apparatus.

7. The apparatus of claim 1, wherein the apparatus comprises two pairs of grasper claws on opposite sides of the apparatus.

8. The apparatus of claim 7, wherein
each of the plurality of grasper claws comprises a gear, and
one grasper claw of each pair of grasper claws has a thinner gear than the other grasper claw of the pair.

9. The apparatus of claim 8, wherein
the grasper claws each comprise a grasping extension, and
the grasping extension is a width of the thinner gear.

10. The apparatus of claim 8, wherein the thinner gear at most half a thickness of a thicker gear of the pair of grasper claws.

11. The apparatus of claim 8, wherein
the grasper claws each comprise a grasping extension, and
the grasping extensions of each pair of grasper claws are configured to pass next to one another when interconnecting with the other apparatus.

12. The apparatus of claim 1, wherein
each grasper claw of the plurality of grasper claws comprises a notch configured to engage with a respective grasper target rod of the other apparatus.

13. The apparatus of claim 1, wherein
the interface plate comprises two grasper target rods, and
each grasper target rod is on an opposite side of the interface plate.

14. A grasp mechanism, comprising:
at least two grasper target rods operably connected to an interface plate of a chassis; and
two pairs of grasper claws operably connected to the chassis, the two pairs of grasper claws configured to connect to or disconnect from respective grasper target rods of another grasp mechanism, wherein
each of the pairs of grasper claws comprises a gear and a grasping extension,
the grasping extension comprises a notch configured to engage with a respective grasper target rod of the other grasp mechanism, and
the grasping extensions of each pair of grasper claws are configured to pass next to one another when interconnecting with the other grasp mechanism.

15. The grasp mechanism of claim 14, further comprising:
a chassis; and
an interface plate integrally formed with or operably connected to the chassis, the interface plate comprising the plurality of grasper target rods.

16. The grasp mechanism of claim 15, wherein the chassis comprises a plurality of holes to reduce chassis weight, provide vias for wiring, or both.

17. The grasp mechanism of claim 15, wherein the chassis comprises a box shape.

18. The grasp mechanism of claim 17, wherein the plurality of grasper claws are located on two opposite faces of the chassis, and a remaining four faces of the chassis do not have grasper claws.

19. The grasp mechanism of claim 15, wherein the interface plate further comprises a plurality of alignment guides configured to assist with aligning the grasp mechanism when the grasp mechanism is interconnected with the other grasp mechanism.

20. The grasp mechanism of claim 14, further comprising:
one or more motors, wherein
each of the one or motors is operably connected to a grasper claw of the two pairs of grasper claws by a respective shaft and configured to connect the grasp mechanism to and disconnect the grasp mechanism from the other grasp mechanism by moving the respective grasper claw.

21. The grasp mechanism of claim 14, wherein
one grasper claw of each pair of grasper claws has a thinner gear than the other grasper claw of the pair, and
the thinner gear is at most half a thickness of a thicker gear of the pair of grasper claws.

22. A grasp mechanism, comprising:
a chassis;
an interface plate integrally formed with or operably connected to the chassis, the interface plate comprising a pair of grasper target rods; and
a plurality of pairs of grasper claws operably connected to the chassis, the plurality of grasper claws configured to connect to or disconnect from respective grasper target rods of another grasp mechanism, wherein
the plurality of grasper claws are operably connected to one or more portions of the chassis other than the interface plate.

23. The grasp mechanism of claim 22, wherein each grasper target rod of the pair of grasper target rods is located on an opposite side of the interface plate.

24. The grasp mechanism of claim 22, wherein
each of the plurality of grasper claws comprises a gear and a grasping extension,
the grasping extension comprises a notch configured to engage with a respective grasper target rod of the other grasp mechanism, and
the grasping extensions of each pair of grasper claws are configured to pass next to one another when interconnecting with the other grasp mechanism.

25. The grasp mechanism of claim 22, wherein the chassis comprises a plurality of holes to reduce chassis weight, provide vias for wiring, or both.

26. The grasp mechanism of claim 22, wherein the chassis comprises a box shape.

27. The grasp mechanism of claim 26, wherein
the grasper mechanism comprises two pairs of grasper claws, and
the plurality of grasper claws are located on two opposite faces of the chassis, and a remaining four faces of the chassis do not have grasper claws.

28. The grasp mechanism of claim 22, wherein the interface plate further comprises a plurality of alignment guides configured to assist with aligning the grasp mechanism when the grasp mechanism is interconnected with the other grasp mechanism.

29. The grasp mechanism of claim 22, further comprising:
one or more motors, wherein
each of the one or motors is operably connected to a grasper claw of the plurality of pairs of grasper claws by a respective shaft and configured to connect the grasp mechanism to and disconnect the grasp mechanism from the other grasp mechanism by moving the respective grasper claw.

30. The grasp mechanism of claim 22, wherein
each grasper claw of the plurality of pairs of grasper claws comprises a gear,
one grasper claw of each pair of grasper claws has a thinner gear than the other grasper claw of the pair, and
the thinner gear is at most half a thickness of a thicker gear of the pair of grasper claws.

\* \* \* \* \*